United States Patent
Ikarashi

(10) Patent No.: US 10,728,045 B2
(45) Date of Patent: Jul. 28, 2020

(54) AUTHENTICATION DEVICE, AUTHENTICATION SYSTEM, AUTHENTICATION METHOD, AND PROGRAM

(71) Applicant: NIPPON TELEGRAPH AND TELEPHONE CORPORATION, Chiyoda-ku (JP)

(72) Inventor: Dai Ikarashi, Musashino (JP)

(73) Assignee: NIPPON TELEGRAPH AND TELEPHONE CORPORATION, Chiyoda-ku (JP)

(*) Notice: Subject to any disclaimer, the term of this patent is extended or adjusted under 35 U.S.C. 154(b) by 98 days.

(21) Appl. No.: 15/574,318

(22) PCT Filed: May 27, 2016

(86) PCT No.: PCT/JP2016/065712
§ 371 (c)(1),
(2) Date: Nov. 15, 2017

(87) PCT Pub. No.: WO2016/194810
PCT Pub. Date: Dec. 8, 2016

(65) Prior Publication Data
US 2018/0294979 A1 Oct. 11, 2018

(30) Foreign Application Priority Data
May 29, 2015 (JP) ................. 2015-109794

(51) Int. Cl.
*H04L 9/32* (2006.01)
*G06F 21/44* (2013.01)
(Continued)

(52) U.S. Cl.
CPC .......... *H04L 9/3271* (2013.01); *G06F 21/445* (2013.01); *H04L 63/0869* (2013.01); *G06F 7/588* (2013.01); *G06F 2221/2103* (2013.01)

(58) Field of Classification Search
CPC ......................... G06F 7/588; G06F 2221/2103
See application file for complete search history.

(56) References Cited

U.S. PATENT DOCUMENTS

| 8,694,783 | B2 * | 4/2014 | Fahn | ..................... H04L 9/3273 713/169 |
| 10,291,398 | B2 * | 5/2019 | Kanemoto | ............ H04L 9/3273 |

(Continued)

FOREIGN PATENT DOCUMENTS

| JP | 2000-48230 | 2/2000 |
| JP | 2003-16493 A | 1/2003 |

(Continued)

OTHER PUBLICATIONS

Reddy, B. Dinesh, V. Valli Kumari, and K. V. S. V. N. Raju. "A new symmetric probabilistic encryption scheme based on random numbers." 2014 First International Conference on Networks & Soft Computing (ICNSC2014). IEEE, 2014. (Year: 2014).*

(Continued)

*Primary Examiner* — Madhuri R Herzog
(74) *Attorney, Agent, or Firm* — Oblon, McClelland, Maier & Neustadt, L.L.P.

(57) ABSTRACT

An authentication device outputs a first challenge value corresponding to a random number along with a first authentication request. A second challenge value is input to the authentication device along with a second authentication request, and the authentication device outputs a second response value which is obtained by encrypting a value corresponding to the second challenge value by using a common key by a symmetric key cryptosystem. A first response value corresponding to the first challenge value is (Continued)

input to the authentication device, and the authentication device decides whether or not a decrypting result which is obtained by decrypting the first response value by using the common key and a value corresponding to the first challenge value coincide with each other.

4 Claims, 5 Drawing Sheets

(51) Int. Cl.
*H04L 29/06* (2006.01)
*G06F 7/58* (2006.01)

(56) References Cited

U.S. PATENT DOCUMENTS

| | | | |
|---|---|---|---|
| 2006/0075248 | A1 | 4/2006 | Westhoff et al. |
| 2008/0240433 | A1 | 10/2008 | Fahn et al. |
| 2014/0223182 | A1* | 8/2014 | Avanzi ............... H04L 9/0838 |
| | | | 713/171 |
| 2015/0222439 | A1* | 8/2015 | Bhattacharya ........ H04L 67/12 |
| | | | 713/169 |
| 2016/0028539 | A1* | 1/2016 | Su ...................... H04L 9/0861 |
| | | | 713/171 |

FOREIGN PATENT DOCUMENTS

| | | |
|---|---|---|
| JP | 2003-263414 A | 9/2003 |
| JP | 2006-109413 A | 4/2006 |
| JP | 2008-85892 A | 4/2008 |
| JP | 2014-134878 A | 7/2014 |
| WO | WO 2014/123675 A1 | 8/2014 |

OTHER PUBLICATIONS

International Search Report dated Jul. 26, 2016 in PCT/JP2016/065712 filed May 27, 2016.
Japanese Notification of Reasons for Refusal dated Jul. 26, 2016 in JP 2015-109794 (with English Translation).
Information Technology, Security techniques—Key management—Part 2: "Mechanisms using symmetric techniques," ISO/IEC 11770-2, 1996, 7 pages.
Extended European Search Report dated Dec. 20, 2018 in Patent Application No. 16803245.6, 10 pages.
"Content Protection for eXtended Media Specification: SD Memory Card Book Common Part" 4C Entity, XP007922643, 2010, pp. 1-29 and Cover Pages.
Focardi, R. "Static Analysis of Authentication" Foundations of Security Analysis and Design III, Lecture Notes in Computer Science, XP019018877, 2005, pp. 109-132.
Menezes, A. et al. "Chapter 10: Identification and Entity Authentication" Handbook of Applied Cryptography, CRC Press, XP001525010, 1996, pp. 385-424 and Cover Page.
Office Action dated Aug. 30, 2019 in European Patent Application No. 16803245.6.
Office Action dated Mar. 27, 2020 in Chinese Application No. 201680030586.3 (w/English translation).

* cited by examiner

AUTHENTICATION DEVICE, AUTHENTICATION SYSTEM, AUTHENTICATION METHOD, AND PROGRAM

TECHNICAL FIELD

The present invention relates to a cryptographic technology and, in particular, to an authentication technology using a cryptographic technology.

BACKGROUND ART

One of authentication technologies is a method using challenge and response (Patent Literature 1). In authentication by conventional challenge and response, (1) first, a device to be authenticated, which requests authentication, sends an authentication request to an authentication device, (2) the authentication device sends a challenge value to the device to be authenticated in response thereto, and (3) the device to be authenticated sends a response value for this challenge value to the authentication device. (4) The authentication device checks the response value against the challenge value, and the authentication device decides that authentication has succeeded when the response value corresponds to the challenge value; otherwise, the authentication device decides that authentication has failed. The authentication device sends an authentication result to the device to be authenticated.

PRIOR ART LITERATURE

Patent Literature

Patent Literature 1: Japanese Patent Application Laid Open No. 2014-134878

SUMMARY OF THE INVENTION

Problems to be Solved by the Invention

In authentication by conventional challenge and response, since an authentication device and a device to be authenticated have the relation of master to servant and, after the device to be authenticated sends an authentication request to the authentication device, the authentication device sends a challenge value to the device to be authenticated in response thereto, four-staged communication has to be performed for one authentication operation.

An object of the present invention is to reduce the number of communications stages in authentication by challenge and response.

Means to Solve the Problems

A first authentication device and a second authentication device store the same common key. The first authentication device outputs a first challenge value corresponding to a first random number along with a first authentication request, and the second authentication device outputs a second challenge value corresponding to a second random number along with a second authentication request.

To the first authentication device, the second challenge value is input along with the second authentication request, and the first authentication device outputs a second response value which is obtained by encrypting a value corresponding to the second challenge value by using the common key by a symmetric key cryptosystem. To the second authentication device, the first challenge value is input along with the first authentication request, and the second authentication device outputs a first response value which is obtained by encrypting a value corresponding to the first challenge value by using the common key by the symmetric key cryptosystem.

The first response value is input to the first authentication device, and the first authentication device decides whether or not a first decoding result which is obtained by decrypting the first response value by using the common key and the value corresponding to the first challenge value coincide with each other. The second response value is input to the second authentication device, and the second authentication device decides whether or not a second decrypting result which is obtained by decrypting the second response value by using the common key and the value corresponding to the second challenge value coincide with each other.

Effects of the Invention

In the present invention, since a first authentication device and a second authentication device do not have the relation of master to servant and send an authentication request and a challenge value to each other at the same time, it is possible to reduce the number of communications stages.

DETAILED DESCRIPTION OF THE EMBODIMENTS

Hereinafter, embodiments of the present invention will be described with reference to the drawings.

First Embodiment

First, a first embodiment will be described.
<Configuration>

Figure 1:
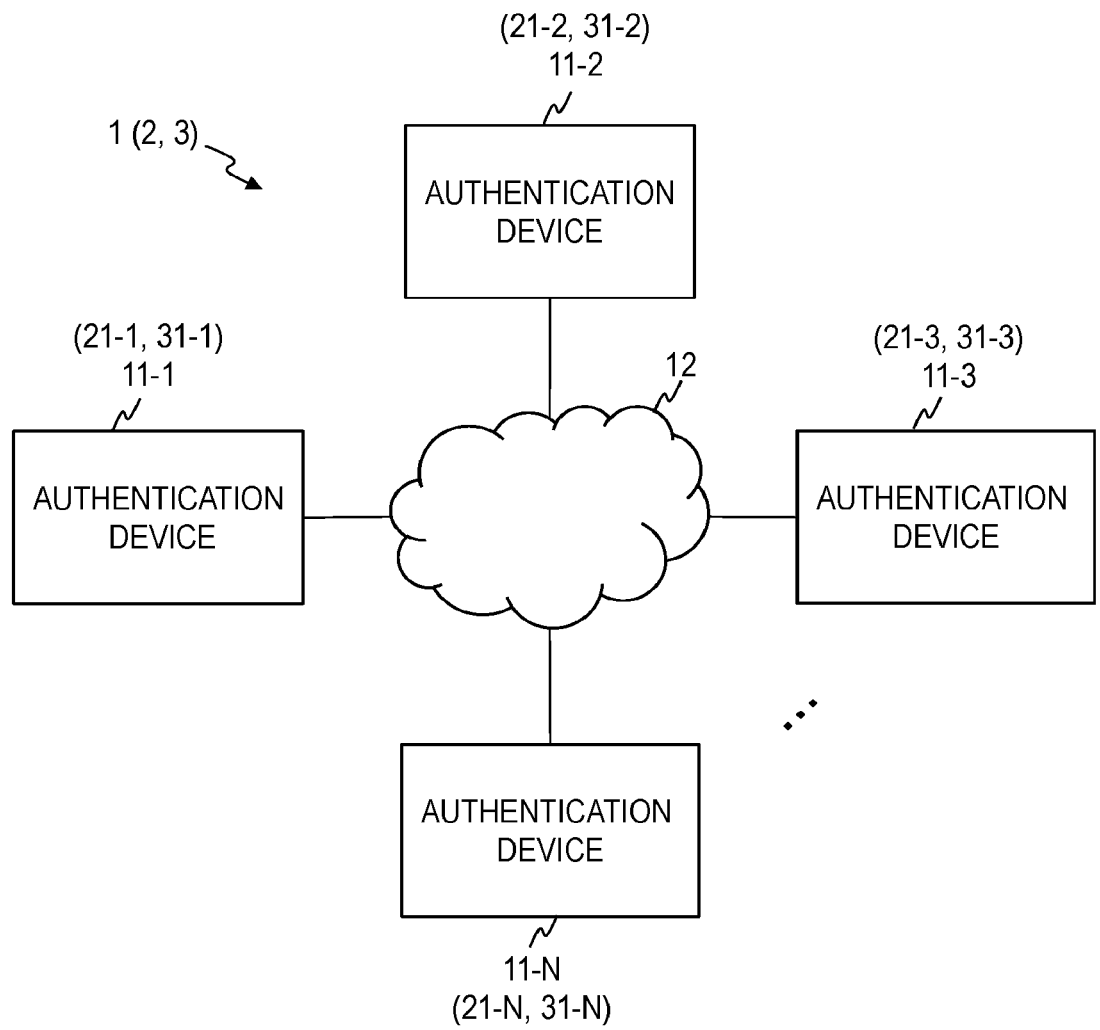
FIG. 1 is a block diagram illustrating the functional configuration of an authentication system of an embodiment.

As illustrated in FIG. 1, an authentication system 1 of the present embodiment includes N authentication devices 11-1 to 11-N. In the present embodiment, N is an integer greater than or equal to 2. The N authentication devices 11-1 to 11-N are each configured so that communication therebetween is possible via a network 12 such as the Internet.

Figure 2:
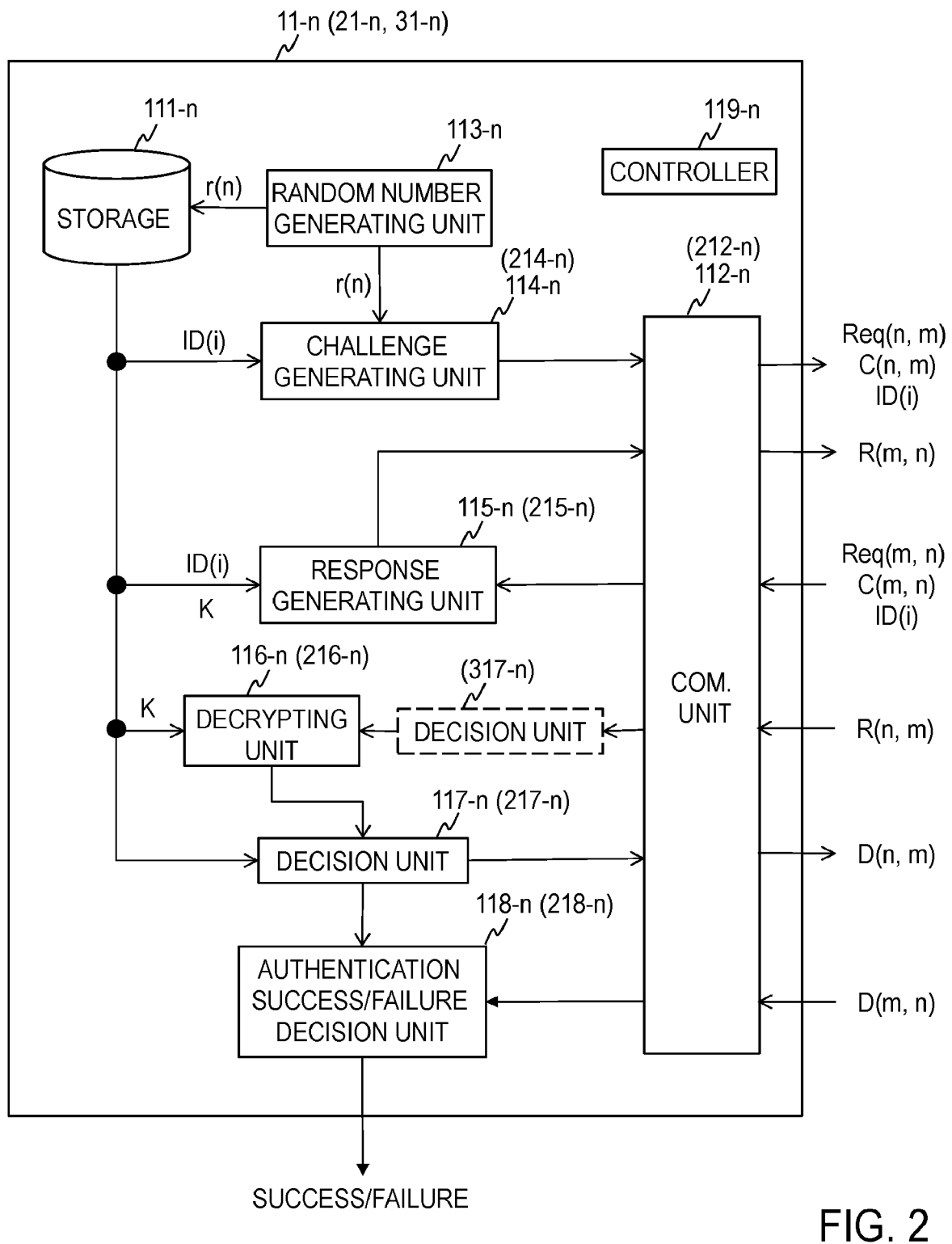
FIG. 2 is a block diagram illustrating the functional configuration of an authentication device of the embodiment.

As illustrated in FIG. 2, the authentication device 11-$n$ ($n\in\{1, \ldots, N\}$) of the present embodiment includes a storage 111-$n$, a communication unit 112-$n$ (an input unit and an output unit), a random number generating unit 113-$n$, a challenge generating unit 114-$n$, a response generating unit 115-$n$, a decrypting unit 116-$n$, a decision unit 117-$n$, an authentication success/failure decision unit 118-$n$, and a controller 119-$n$. The authentication device 11-$n$ is a device which is configured as a result of a general-purpose or dedicated computer, which is provided with a processor (a hardware processor) such as a central processing unit (CPU), memory such as random-access memory (RAM) or read-only memory (ROM), and so forth, executing a predetermined program. This computer may be provided with one processor or one type of memory or may be provided with a plurality of processors or a plurality of types of memory. This program may be installed in the computer or may be recorded on the ROM or the like in advance. Furthermore, instead of using an electronic circuit (circuitry) that implements, like a CPU, functional configurations as a result of a program being read, part or all of the processing units may be configured by using an electronic circuit that implements processing functions without using a program. In addition, an electronic circuit that constitutes one device may include a plurality of CPUs. The authentication device 11-$n$ executes each processing under control of the controller 119-$n$. Though not explained in the following description, the data input to the communication unit 112-$n$ and the data obtained by each processing unit are stored in an unillustrated temporary memory and used when necessary by being read by any processing unit.

<Preprocessing>

As preprocessing, a common key K of a symmetric key cryptosystem is stored in the storage 111-$n$ (FIG. 2) of each authentication device 11-$n$ ($n \in \{1, \ldots, N\}$). This symmetric key cryptosystem is not limited to a particular symmetric key cryptosystem, and Advanced Encryption Standard (AES) or Camellia (a registered trademark), for example, can be used. The symmetric key cryptosystem of the present embodiment may be a probabilistic cryptosystem or a deterministic cryptosystem. The probabilistic cryptosystem is a cryptosystem in which cipher text has randomness, and is a system in which more than one cipher text corresponds to one plaintext and any one of them is selected at the time of encryption. An example of the probabilistic cryptosystem is AES in CBC mode. The deterministic cryptosystem is a cryptosystem in which cipher text does not have randomness, and is a system in which one cipher text corresponds to one plaintext. Furthermore, a unique identifier ID($n$) ($n \in \{1, \ldots, N\}$) is allocated to each authentication device 11-$n$, and all the identifiers ID(1), . . . , ID(N) are stored in the storage 111-$n$ of each authentication device 11-$n$.

<Authentication Processing>

Figure 3:
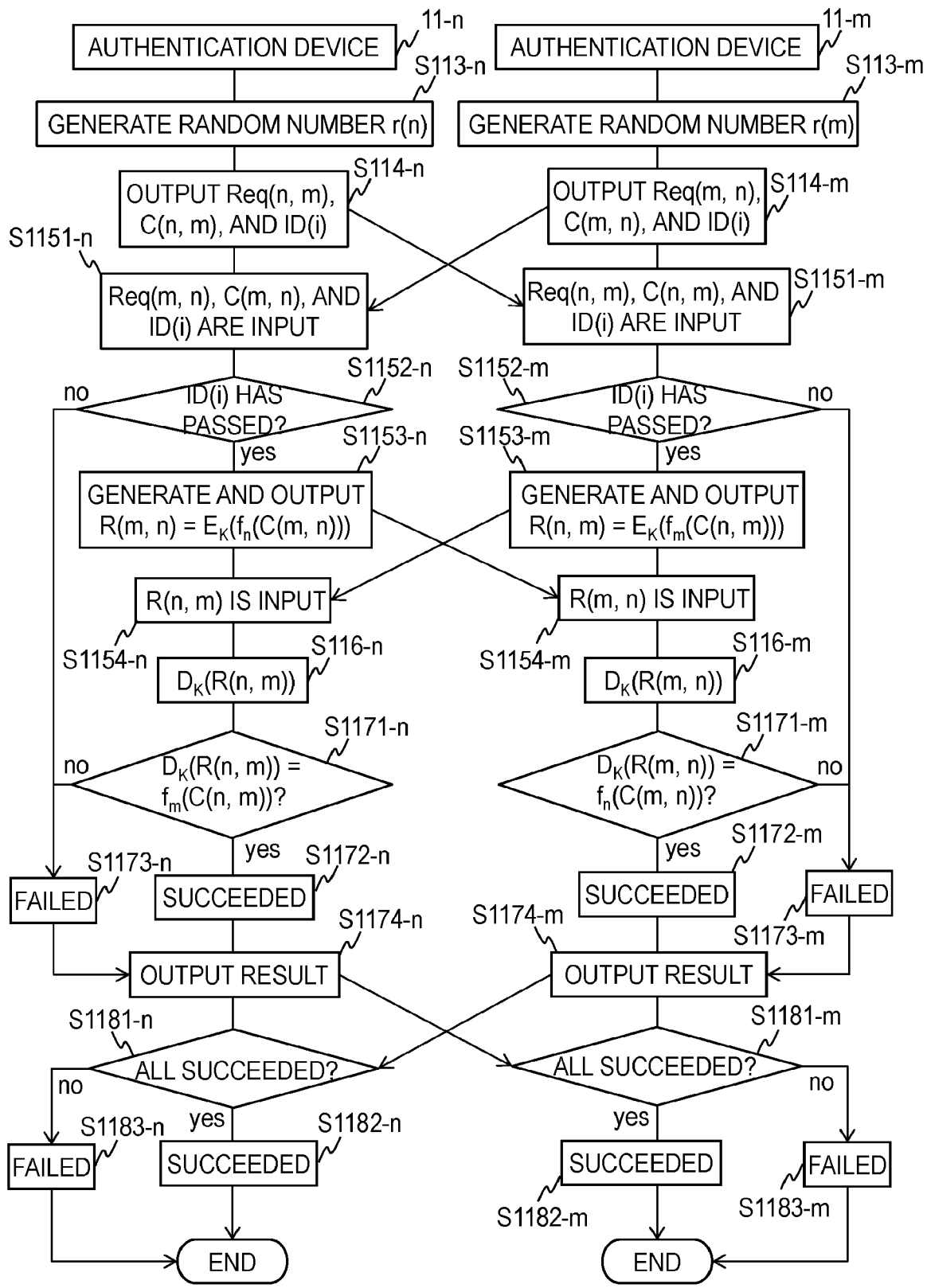
FIG. 3 is a flow diagram for illustrating processing of a first embodiment.

Authentication processing of the present embodiment will be described by using FIG. 3. Hereinafter, an example in which authentication processing is performed between one authentication device 11-$n$ ($n \in \{1, \ldots, N\}$) and one authentication device 11-$m$ ($m \in \{1, \ldots, N\}$) will be described. However, the other pair of authentication devices may perform authentication processing in the same manner. Moreover, processing of the authentication device 11-$n$ and processing of the authentication device 11-$m$ are symmetrical and one of the devices may perform the processing before the other; hereinafter, description will be given in a particular order for the purpose of illustration.

The random number generating unit 113-$n$ of the authentication device 11-$n$ generates a random number r($n$) (a first random number), stores the random number r($n$) in the storage 111-$n$, and sends the random number r($n$) to the challenge generating unit 114-$n$ (Step S113-$n$).

A random number generating unit 113-$m$ of the authentication device 11-$m$ generates a random number r($m$) (a second random number), stores the random number r($m$) in a storage 111-$m$, and sends the random number r($m$) to a challenge generating unit 114-$m$ (Step S113-$m$).

The challenge generating unit 114-$n$ generates a challenge value C($n$, $m$) (a first challenge value) corresponding to the random number r($n$). The challenge value C($n$, $m$) may be the random number r($n$) itself, information including the random number r($n$), the function value of the random number r($n$), or the function value of information including the random number r($n$). Such a challenge value is written as $C(n, m) = g_n(r(n))$. Moreover, the challenge generating unit 114-$n$ reads identifiers ID($n$) and ID($m$) from the storage 111-$n$. Furthermore, the challenge generating unit 114-$n$ generates an authentication request Req($n$, $m$) (a first authentication request) from the authentication device 11-$n$ to the authentication device 11-$m$. The authentication request Req($n$, $m$), the challenge value C($n$, $m$), and the identifiers ID($n$) and ID($m$) are sent to the communication unit 112-$n$, and the communication unit 112-$n$ outputs (transmits) the challenge value C($n$, $m$) and the identifiers ID($n$) and ID($m$) along with the authentication request Req($n$, $m$). Incidentally, the authentication request Req($n$, $m$) is an authentication request for requesting authentication of the authentication device 11-$n$ which is performed by the other authentication device 11-$m$. The challenge value C($n$, $m$) is a challenge value for authentication of the other authentication device 11-$m$ which is performed by the authentication device 11-$n$ (Step S114-$n$).

The challenge generating unit 114-$m$ generates a challenge value C($m$, $n$) (a second challenge value) corresponding to the random number r($m$). The challenge value C($m$, $n$) may be the random number r($m$) itself, information including the random number r($m$), the function value of the random number r($m$), or the function value of information including the random number r($m$). Such a challenge value is written as $C(m, n) = g_m(r(m))$. Moreover, the challenge generating unit 114-$m$ reads the identifiers ID($n$) and ID($m$) from the storage 111-$m$. Furthermore, the challenge generating unit 114-$m$ generates an authentication request Req($m$, $n$) (a second authentication request) from the authentication device 11-$m$ to the authentication device 11-$n$. The authentication request Req($m$, $n$), the challenge value C($m$, $n$), and the identifiers ID($n$) and ID($m$) are sent to a communication unit 112-$m$, and the communication unit 112-$m$ outputs (transmits) the challenge value C($m$, $n$) and the identifiers ID($n$) and ID($m$) along with the authentication request Req($m$, $n$). Incidentally, the authentication request Req($m$, $n$) is an authentication request for requesting authentication of the authentication device 11-$m$ which is performed by the other authentication device 11-$n$. The challenge value C($m$, $n$) is a challenge value for authentication of the other authentication device 11-$n$ which is performed by the authentication device 11-$m$ (Step S114-$m$).

The authentication request Req($m$, $n$), the challenge value C($m$, $n$), and the identifiers ID($n$) and ID($m$) sent from the authentication device 11-$m$ are input to the communication unit 112-$n$ of the authentication device 11-$n$ and sent to the response generating unit 115-$n$ (Step S1151-$n$). The response generating unit 115-$n$ reads the identifiers ID($n$) and ID($m$) (which are written as "ID'($n$) and ID'($m$)" for the sake of convenience) from the storage 111-$n$, and a decision as to whether or not the identifiers ID'($n$) and ID'($m$) read from the storage 111-$n$ and the identifiers ID($n$) and ID($m$) transmitted from the authentication device 11-$m$ are respectively equal to each other is made (Step S1152-$n$). Here, when ID'($n$)=ID($n$) and ID'($m$)=ID($m$), a decision is made that ID($n$) and ID($m$) have passed and the procedure proceeds to Step S1153-$n$. On the other hand, when ID'($n$) ID($n$) or ID'($m$)≠ID($m$), a decision is made that authentication has failed (Step S1173-$n$) and the procedure proceeds to Step S1174-$n$. In Step S1153-$n$, the response generating unit 115-$n$ reads the common key K from the storage 111-$n$. The response generating unit 115-$n$ obtains a response value R(m, n) (a second response value) by encrypting a value corresponding to the challenge value C(m, n) (the second challenge value) by using the common key K by the above-mentioned symmetric key cryptosystem and outputs the response value R(m, n). The value corresponding to the challenge value C(m, n) may be the challenge value C(m, n) itself, information including the challenge value C(m, n), the function value of the challenge value C(m, n), or the function value of information including the challenge value C(m, n). Such a value corresponding to the challenge value C(m, n) is written as $f_n(C(m, n))$. $R(m, n)=E_K(f_n(C(m, n)))$ holds where cipher text which is obtained by encrypting $f_n(C(m, n))$ by using the common key K by the above-mentioned symmetric key cryptosystem is written as $E_K(f_n(C(m, n)))$. The response value R(m, n) is sent to the communication unit 112-$n$, and the communication unit 112-$n$ outputs (transmits) the response value R(m, n) (Step S1153-$n$).

Likewise, also in the authentication device 11-$m$, a response generating unit 115-$m$ reads the identifiers ID(n) and ID(m) (which are written as "ID"(n) and ID"(m)" for the sake of convenience) from the storage 111-$m$, and a decision as to whether or not the identifiers ID"(n) and ID"(m) read from the storage 111-$m$ and the identifiers ID(n) and ID(m) transmitted from the authentication device 11-$n$ are respectively equal to each other is made (Step S1152-$m$). Here, when ID"(n)=ID(n) and ID"(m)=ID(m), a decision is made that ID(n) and ID(m) have passed and the procedure proceeds to Step S1153-$m$. On the other hand, when ID"(n)≠ID(n) or 1D"(m)≠ID(m), a decision is made that authentication has failed (Step S1173-$m$) and the procedure proceeds to Step S1174-$m$. In Step S1153-$m$, the response generating unit 115-$m$ reads the common key K from the storage 111-$m$. The response generating unit 115-$m$ obtains a response value R(n, m) (a first response value) by encrypting a value corresponding to the challenge value C(n, m) (the first challenge value) by using the common key K by the above-mentioned symmetric key cryptosystem and outputs the response value R(n, m). The value corresponding to the challenge value C(n, m) may be the challenge value C(n, m) itself, information including the challenge value C(n, m), the function value of the challenge value C(n, m), or the function value of information including the challenge value C(n, m). Such a value corresponding to the challenge value C(n, m) is written as $f_m(C(n, m))$. $R(n, m)=E_K(f_m(C(n, m)))$ holds where cipher text which is obtained by encrypting $f_m(C(n, m))$ by using the common key K by the above-mentioned symmetric key cryptosystem is written as $E_K(f_m(C(n, m)))$. The response value R(n, m) is sent to the communication unit 112-$m$, and the communication unit 112-$m$ outputs (transmits) the response value R(n, m) (Step S1153-$m$).

The response value R(n, m) is input to the communication unit 112-$n$ of the authentication device 11-$n$ and sent to the decrypting unit 116-$n$ (Step S1154-$n$). The decrypting unit 116-$n$ reads the common key K from the storage 111-$n$, obtains a decrypting result $D_K(R(n, m))$ (a first decrypting result) by decrypting the response value R(n, m) by using the common key K in accordance with the above-mentioned symmetric key cryptosystem, and outputs the decrypting result $D_K(R(n, m))$. The decrypting result $D_K(R(n, m))$ is sent to the decision unit 117-$n$ (Step S116-$n$). The decision unit 117-$n$ reads the random number r(n) from the storage 111-$n$ and decides whether or not the decrypting result $D_K(R(n, m))$ coincides with the value $f_m(C(n, m))$ corresponding to $C(n, m)=g_n(r(n))$ (that is, whether or not $D_K(R(n, m))=f_m(C(n, m))$ is satisfied). For example, a decision as to whether or not $D_K(R(n, m))=C(n, m)$ is made (Step S1171-$n$). Here, when the response value R(n, m) has been properly generated by using the common key K, $D_K(R(n, m))=f_m(C(n, m))$ is satisfied. On the other hand, the probability of being capable of generating the response value R(n, m) satisfying $D_K(R(n, m))=f_m(C(n, m))$ without using the common key K is negligibly small. Thus, based on a decision as to whether or not $D_K(R(n, m))=f_m(C(n, m))$ is satisfied, a decision as to whether or not the response value R(n, m) has been generated by a rightful device that holds the common key K can be made. Based on this, when $D_K(R(n, m))=f_m(C(n, m))$, authentication is regarded as having succeeded (Step S1172-$n$) and the procedure proceeds to Step S1174-$n$. On the other hand, when $D_K(R(n, m))≠f_m(C(n, m))$, authentication is regarded as having failed (Step S1173-$n$) and the procedure proceeds to Step S1174-$n$. In Step S1174-$n$, the decision unit 117-$n$ sends authentication success/failure information $D(n, m)∈\{T, F\}$ indicating whether authentication has succeeded (T) or failed (F) to the authentication success/failure decision unit 118-$n$ and the communication unit 112-$n$. The communication unit 112-$n$ outputs (transmits) the authentication success/failure information D(n, m) (Step S1174-$n$).

Likewise, the response value R(m, n) sent from the authentication device 11-$n$ is input to the communication unit 112-$m$ of the authentication device 11-$m$ and sent to a decrypting unit 116-$m$ (Step S1154-$m$). The decrypting unit 116-$m$ reads the common key K from the storage 111-$m$, obtains a decrypting result $D_K(R(m, n))$ (a second decrypting result) by decrypting the response value R(m, n) by using the common key K in accordance with the above-mentioned symmetric key cryptosystem, and outputs the decrypting result $D_K(R(m, n))$. The decrypting result $D_K(R(m, n))$ is sent to the decision unit 117-$n$ (Step S116-$m$). The decision unit 117-$n$ reads the random number r(m) from the storage 111-$n$ and decides whether or not the decrypting result $D_K(R(m, n))$ coincides with the value $f_n(C(m, n))$ corresponding to $C(m, n)=g_m(r(m))$ (that is, whether or not $D_K(R(m, n))=f_n(C(m, n))$ is satisfied). For example, a decision as to whether or not $D_K(R(m, n))=C(m, n)$ is made (Step S1171-$m$). Here, when the response value R(m, n) has been properly generated by using the common key K, $D_K(R(m, n))=f_n(C(m, n))$ is satisfied. On the other hand, the probability of being capable of generating the response value R(m, n) satisfying $D_K(R(m, n))=f_n(C(m, n))$ without using the common key K is negligibly small. Thus, based on a decision as to whether or not $D_K(R(m, n))=f_n(C(m, n))$ is satisfied, a decision as to whether or not the response value R(m, n) has been generated by a rightful device that holds the common key K can be made. Based on this, when $D_K(R(m, n))=f_n(C(m, n))$, authentication is regarded as having succeeded (Step S1172-$m$) and the procedure proceeds to Step S1174-$m$. On the other hand, when $D_K(R(m, n))≠f_n(C(m, n))$, authentication is regarded as having failed (Step S1173-$m$) and the procedure proceeds to Step S1174-$m$. In Step S1174-$m$, a decision unit 117-$m$ sends authentication success/failure information $D(m, n)∈\{T, F\}$ indicating whether authentication has succeeded (T) or failed (F) to an authentication success/failure decision unit 118-$m$ and the communication unit 112-$m$. The communication unit 112-$m$ outputs (transmits) the authentication success/failure information D(m, n) (Step S1174-$m$).

The authentication success/failure information D(m, n) sent from the authentication device 11-$m$ is input to the communication unit 112-$n$ of the authentication device 11-$n$ and sent to the authentication success/failure decision unit 118-$n$. The authentication success/failure decision unit 118-$n$ decides whether or not the authentication success/failure information D(n, m) and D(m, n) indicates that "authentication has succeeded (T)" (Step S1181-$n$). When all of these pieces of information indicate that "authentication has succeeded (T)" (D(n, m)=D(m, n)=T), the authentication success/failure decision unit 118-$n$ outputs information representing that authentication has finally succeeded (Step S1182-$n$). On the other hand, when at least one piece of the authentication success/failure information D(n, m) and D(m, n) indicates that "authentication has failed (F)" (D(n, m)=F or D(m, n)=F), the authentication success/failure decision unit 118-$n$ outputs information representing that authentication has finally failed (Step S1183-$n$).

Likewise, the authentication success/failure information D(n, m) sent from the authentication device 11-$n$ is input to the communication unit 112-$m$ of the authentication device 11-$m$ and sent to the authentication success/failure decision unit 118-$m$. The authentication success/failure decision unit 118-$m$ decides whether or not the authentication success/failure information D(n, m) and D(m, n) indicates that "authentication has succeeded (T)" (Step S1181-$m$). When all of these pieces of information indicate that "authentication has succeeded (T)" (D(n, m)=D(m, n)=T), the authentication success/failure decision unit 118-$m$ outputs information representing that authentication has finally succeeded (Step S1182-$m$). On the other hand, when at least one piece of the authentication success/failure information D(n, m) and D(m, n) indicates that "authentication has failed (F)" (D(n, m)=F or D(m, n)=F), the authentication success/failure decision unit 118-$m$ outputs information representing that authentication has finally failed (Step S1183-$m$).

<Features of the Present Embodiment>

In the present embodiment, the authentication device 11-$n$ and the authentication device 11-$m$ of equal status start authentication processing by transmitting challenge values to each other along with authentication requests and perform symmetrical authentication processing. Therefore, communication which has to be performed by each device is three-staged communication: (1) output of an authentication request and a challenge, (2) input of a response thereto, and (3) output of an authentication result, which makes it possible to reduce the number of communications stages as compared to the conventional example.

Moreover, in the present embodiment, authentication is regarded as having finally succeeded when all of the pieces of authentication success/failure information indicate that "authentication has succeeded"; otherwise, authentication is regarded as having finally failed. As a result, each of the authentication devices can confirm that an authentication device, which is a communications partner, is a rightful authentication device.

Second Embodiment

In a second embodiment, three or more authentication devices concurrently perform symmetrical authentication processing. Hereinafter, a difference from those described above will be mainly explained and explanations about the matters that have already been described will be simplified by using the same reference character.

<Configuration>

As illustrated in FIG. 1, an authentication system 2 of the present embodiment includes N authentication devices 21-1 to 21-N. In the present embodiment, N is an integer greater than or equal to 3. The N authentication devices 21-1 to 21-N are each configured so that communication therebetween is possible via the network 12 such as the Internet.

As illustrated in FIG. 2, the authentication device 21-$n$ ($n \in \{1, \ldots, N\}$) of the present embodiment includes the storage 111-$n$, a communication unit 212-$n$ (an input unit and an output unit), the random number generating unit 113-$n$, a challenge generating unit 214-$n$, a response generating unit 215-$n$, a decrypting unit 216-$n$, a decision unit 217-$n$, an authentication success/failure decision unit 218-$n$, and the controller 119-$n$. The authentication device 21-$n$ may be a device which is configured as a result of the computer described in the first embodiment executing a predetermined program, or part or all of the processing units may be configured by using an electronic circuit that implements processing functions without using a program. The authentication device 21-$n$ executes each processing under control of the controller 119-$n$. Moreover, though not explained in the following description, the data input to the communication unit 212-$n$ and the data obtained by each processing unit are stored in an unillustrated temporary memory and used when necessary by being read by any processing unit.

<Preprocessing>

Preprocessing is the same as that of the first embodiment.

<Authentication Processing>

Figure 4:
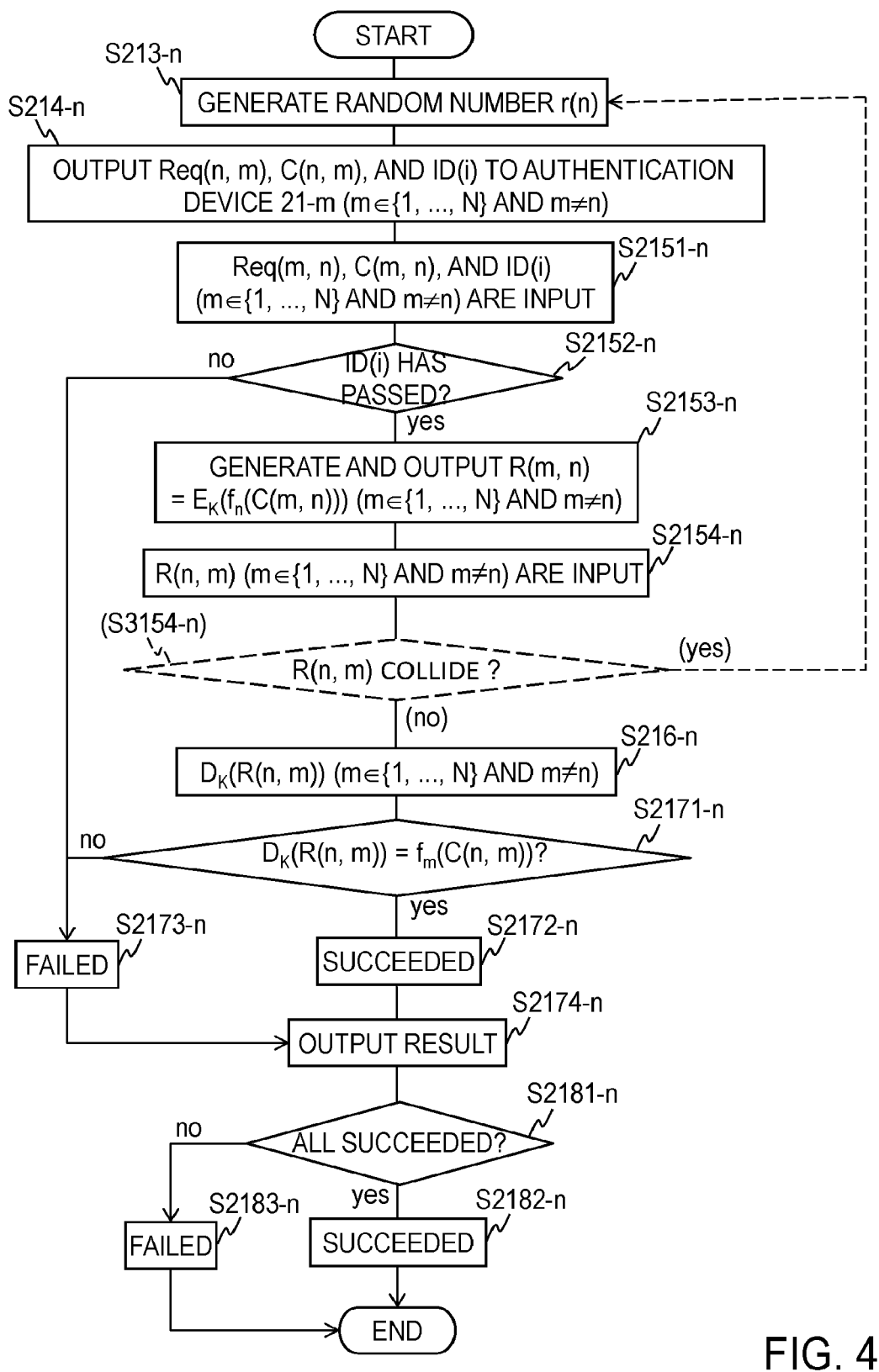
FIG. 4 is a flow diagram for illustrating processing of second and third embodiments.

Authentication processing of the present embodiment will be described by using FIG. 4. In the present embodiment, each authentication device 21-$n$ ($n \in \{1, \ldots, N\}$) concurrently performs authentication processing similar to that of the first embodiment with a plurality of (N−1) other authentication devices 21-$m$ ($m \in \{1, \ldots, N\}$ and $n \neq m$). However, while one-to-one authentication processing is performed in the first embodiment, each authentication device 21-$n$ performs one-to-many authentication processing in the present embodiment. Specifically, for instance, each authentication device 21-$n$ ($n \in \{1, \ldots, N\}$) performs the following processing.

The random number generating unit 113-$n$ of each authentication device 21-$n$ ($n \in \{1, \ldots, N\}$) generates a random number r(n) (a first random number), stores the random number r(n) in the storage 111-$n$, and sends the random number r(n) to the challenge generating unit 214-$n$ (Step S213-$n$).

Each challenge generating unit 214-$n$ generates N−1 challenge values C(n, m)=$g_n$(r(n)) (a first challenge value) ($m \in \{1, \ldots, N\}$ and $n \neq m$) corresponding to the random number r(n). However, the challenge values C(n, m) corresponding to the values of in may be the same or may not be the same. Moreover, each challenge generating unit 214-$n$ reads identifiers ID(1), . . . , ID(N) from the storage 111-$n$. Furthermore, each challenge generating unit 214-$n$ generates an authentication request Req(n, m) (a first authentication request) from the authentication device 21-$n$ to the N−1 authentication devices 21-$m$ ($m \in \{1, \ldots, N\}$ and $n \neq m$). The authentication request Req(n, m), the challenge values C(n, m), and the identifiers ID(1), . . . , ID(N) are sent to the communication unit 212-$n$, and each communication unit 212-$n$ outputs (transmits) the challenge values C(n, m) and the identifiers ID(1), . . . , ID(N) to each authentication device 21-$m$ ($m \in \{1, \ldots, N\}$ and $n \neq m$) along with the authentication request Req(n, m). Incidentally, the authentication request Req(n, m) is an authentication request for requesting authentication of the authentication device 21-$n$ which is performed by the plurality of other authentication devices 21-$m$. The challenge values C(n, m) are challenge values for authentication of the plurality of other authentication devices 21-$m$ which is performed by the authentication device 21-$n$ (Step S214-$n$).

The authentication requests Req(m, n), the challenge values C(m, n), and the identifiers ID(1), . . . , ID(N) transmitted from the N−1 authentication devices 21-$m$ (m∈{1, . . . , N} and n≠m) are input to the communication unit 212-$n$ of each authentication device 21-$n$ and sent to the response generating unit 215-$n$ (Step S2151-$n$). The response generating unit 215-$n$ reads the identifiers ID(1), . . . , ID(N) (which are written as "ID'(1), . . . , ID'(N)" for the sake of convenience) from the storage 111-$n$, and a decision as to whether or not the identifiers ID'(1), . . . , ID'(N) read from the storage 111-$n$ and the identifiers ID(1), . . . , ID(N) transmitted from the N−1 authentication devices 21-$m$ are respectively identical with each other is made (Step S2152-$n$). Here, when ID'(i)=ID(i) for all of i∈{1, . . . , N}, it is regarded that ID(1), . . . , ID(N) have passed, and the procedure proceeds to Step S2153-$n$. On the other hand, when ID'(i)≠ID(i) for any i, it is regarded that authentication has failed (Step S2173-$n$), and the procedure proceeds to Step S2174-$n$. In Step S2153-$n$, the response generating unit 215-$n$ reads the common key K from the storage 111-$n$. The response generating unit 215-$n$ obtains N−1 response values R(m, n)=$E_K$($f_n$(C(m, n))) (a second response value) by encrypting a value $f_n$(C(m, n)) corresponding to each of the N−1 challenge values C(m, n) (m∈{1, . . . , N} and n≠m) (a second challenge value) by using the common key K by the above-mentioned symmetric key cryptosystem and outputs the N−1 response values R(m, n). The response values R(m, n) are sent to the communication unit 212-$n$, and the communication unit 212-$n$ outputs (transmits) the N−1 response values R(m, n) (Step S2153-$n$).

The N−1 response values R(n, m) transmitted from the N−1 authentication devices 21-$m$ (m∈{1, . . . , N} and n≠m) are input to the communication unit 212-$n$ of each authentication device 21-$n$ and sent to the decrypting unit 216-$n$ (Step S2154-$n$). Each decrypting unit 216-$n$ reads the common key K from the storage 111-$n$, obtains N−1 decrypting results $D_K$(R(n, m)) (a first decrypting result) by decrypting the response values R(n, m) by using the common key K in accordance with the above-mentioned symmetric key cryptosystem, and outputs the N−1 decrypting results $D_K$(R(n, m)). The N−1 decrypting results $D_K$(R(n, m)) are sent to the decision unit 217-$n$ (Step S216-$n$). The decision unit 217-$n$ reads the random number r(n) from the storage 111-$n$ and decides whether or not each decrypting result $D_K$(R(n, m)) coincides with a value $f_m$(C(n, m)) corresponding to C(n, m)=$g_n$(r(n)) (that is, whether or not $D_K$(R(n, m))=$f_m$(C(n, m)) is satisfied). For instance, a decision as to whether or not $D_K$(R(n, m))=C(n, m) is satisfied is made (Step S2171-$n$). Here, when $D_K$(R(n, m))=$f_m$(C(n, m)) for all of the values of in (m∈{1, . . . , N} and n≠m), it is regarded that authentication has succeeded (Step S2172-$n$) and the procedure proceeds to Step S2174-$n$. On the other hand, when $D_K$(R(n, m))≠$f_m$(C(n, m)) for any of the values of in, it is regarded that authentication has failed (Step S2173-$n$) and the procedure proceeds to Step S2174-$n$. In Step S2174-$n$, the decision unit 217-$n$ sends authentication success/failure information D(n,m)∈{T, F} indicating whether authentication has succeeded (T) or failed (F) to the authentication success/failure decision unit 218-$n$ and the communication unit 212-$n$. The communication unit 212-$n$ outputs (transmits) the authentication success/failure information D(n, m) to the N−1 authentication devices 21-$m$ (m∈{1, . . . , N} and n≠m) (Step S2174-$n$).

The N−1 pieces of authentication success/failure information D(m, n) sent from the N−1 authentication devices 21-$m$ are input to the communication unit 212-$n$ of the authentication device 21-$n$ and sent to the authentication success/failure decision unit 218-$n$. Each authentication success/failure decision unit 218-$n$ decides whether the authentication success/failure information D(n, m) and the N−1 D(m, n) (m∈{1, . . . , N} and n≠m) indicate that "authentication has succeeded (T)" (Step S2181-$n$). When all of these pieces of information indicate that "authentication has succeeded (T)" (D(n,m)=D(m, n)=T), the authentication success/failure decision unit 218-$n$ outputs information representing that authentication has finally succeeded (Step S2182-$n$). On the other hand, when any piece of the authentication success/failure information D(n, m) and D(m, n) indicates that "authentication has failed (F)", the authentication success/failure decision unit 218-$n$ outputs information representing that authentication has finally failed (Step S2183-$n$).

<An Example in Which N=3>

An example of the exchange of information among the authentication devices 21-1 to 21-3 when N=3 will be described by using FIGS. 5A and 5B.

<<Steps S213-1, S213-2, S213-3>>

Figure 5A:
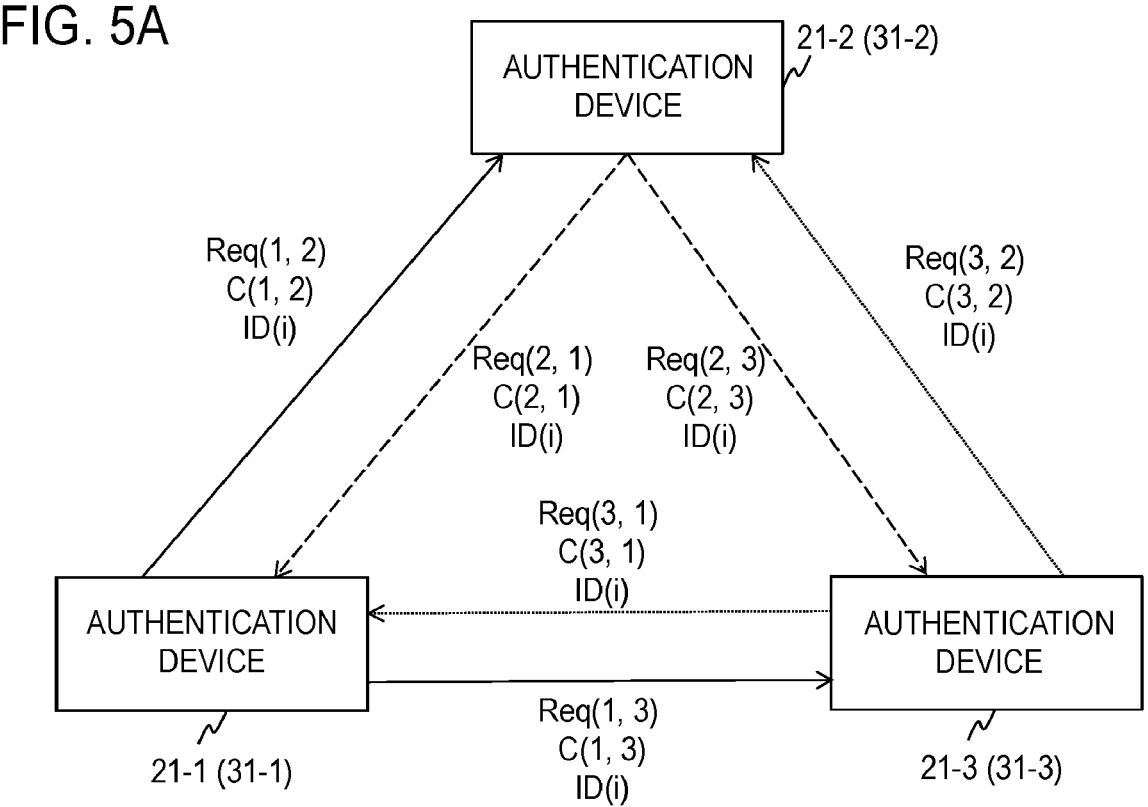
FIGS. 5A and 5B are conceptual diagrams for illustrating the processing of the second and third embodiments.

As illustrated in FIG. 5A, in Step S213-1, the authentication device 21-1 sends (Req(1, 2), C(1, 2), ID(1), . . . , ID(N)) and (Req(1, 3), C(1, 3), ID(1), . . . , ID(N)) to the authentication device 21-2 and the authentication device 21-3, respectively. In Step S213-2, the authentication device 21-2 sends (Req(2, 1), C(2, 1), ID(1), . . . , ID(N)) and (Req(2, 3), C(2, 3), ID(1), . . . , ID(N)) to the authentication device 21-1 and the authentication device 21-3, respectively. In Step S213-3, the authentication device 21-3 sends (Req(3, 1), C(3, 1), ID(1), . . . , ID(N)) and (Req(3, 2), C(3, 2), ID(1), . . . , ID(N)) to the authentication device 21-1 and the authentication device 21-2, respectively.

<<Steps S2153-1, S2153-2, S2153-3>>

Figure 5B:
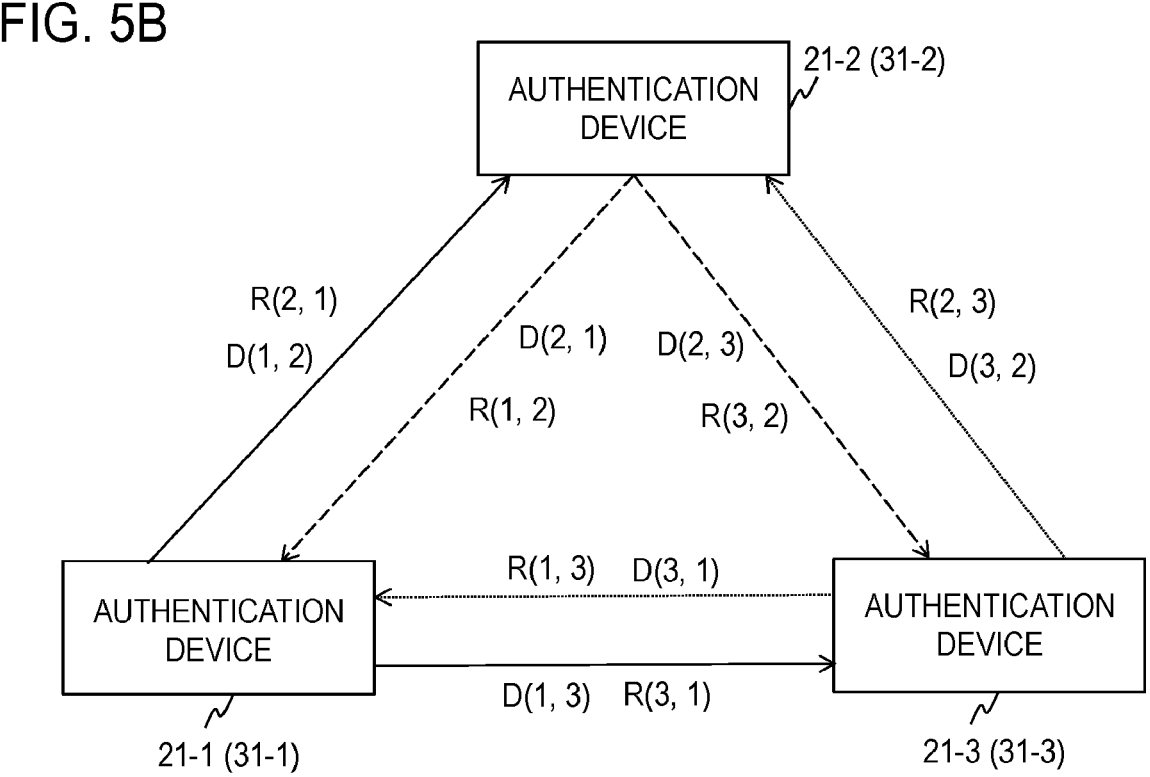

As illustrated in FIG. 5B, in Step S2153-1, the authentication device 21-1 sends R(2, 1) and R(3, 1) to the authentication device 21-2 and the authentication device 21-3, respectively. In Step S2153-2, the authentication device 21-2 sends R(1, 2) and R(3, 2) to the authentication device 21-1 and the authentication device 21-3, respectively. In Step S2153-3, the authentication device 21-3 sends R(2, 3) and R(1, 3) to the authentication device 21-1 and the authentication device 21-2, respectively.

<<Steps S2174-1, S2174-2, S2174-3>>

As illustrated in FIG. 5B, in Step S2174-1, the authentication device 21-1 sends D(1, 2) and D(1, 3) to the authentication device 21-2 and the authentication device 21-3, respectively. In Step S2174-2, the authentication device 21-2 sends D(2, 1) and D(2, 3) to the authentication device 21-1 and the authentication device 21-3, respectively. In Step S2174-3, the authentication device 21-3 sends D(3, 1) and D(3, 2) to the authentication device 21-1 and the authentication device 21-2, respectively.

<Features of the Present Embodiment>

In the present embodiment, an authentication device 11-$n$ and a plurality of authentication devices 11-$m$ (m∈{1, . . . , N} and n≠m), the authentication devices 11-$n$ and 11-$m$ being of equal status, start authentication processing by transmitting a challenge value along with an authentication request and concurrently perform symmetrical authentication processing. Also in this case, communication which has to be performed by each device is three-staged communication: (1) output of an authentication request and a challenge, (2) input of a response thereto, and (3) output of an authentication result, which makes it possible to reduce the number of communications stages as compared to the conventional example. Furthermore, since each authentication device 11-$n$ concurrently executes one-to-many authentication processing with a plurality of authentication devices 11-$m$, it is possible to perform authentication processing efficiently with the plurality of authentication devices 11-$m$.

Moreover, in the present embodiment, it is regarded that authentication has finally succeeded when all of the pieces of authentication success/failure information indicate that "authentication has succeeded"; otherwise, it is regarded that authentication has finally failed. As a result, each of the authentication devices can confirm that all the authentication devices are rightful authentication devices.

Third Embodiment

The present embodiment is a modification of the second embodiment. Also in the present embodiment, three or more authentication devices concurrently perform symmetrical authentication processing. A difference from the second embodiment is that the symmetric key cryptosystem is limited to the probabilistic cryptosy stem and retry is performed when some of the response values R(m, n) returned to the authentication device 21-$n$ from the N−1 authentication devices 21-$m$ are the same.

<Configuration>

As illustrated in FIG. 1, an authentication system 3 of the present embodiment includes N authentication devices 31-1 to 31-N. In the present embodiment, N is an integer greater than or equal to 3. The N authentication devices 31-1 to 31-N are each configured so that communication therebetween is possible via the network 12 such as the Internet.

As illustrated in FIG. 2, the authentication device 31-$n$ ($n\in\{1, \ldots, N\}$) of the present embodiment includes the storage 111-$n$, the communication unit 212-$n$ (an input unit and an output unit), the random number generating unit 113-$n$, the challenge generating unit 214-$n$, the response generating unit 215-$n$, the decrypting unit 216-$n$, decision units 217-$n$ and 317-$n$, the authentication success/failure decision unit 218-$n$, and the controller 119-$n$. The authentication device 31-$n$ may be a device which is configured as a result of the computer described in the first embodiment executing a predetermined program, or part or all of the processing units may be configured by using an electronic circuit that implements processing functions without using a program. The authentication device 31-$n$ executes each processing under control of the controller 119-$n$. Moreover, though not explained in the following description, the data input to the communication unit 212-$n$ and the data obtained by each processing unit are stored in an unillustrated temporary memory and used when necessary by being read by any processing unit.

<Preprocessing>

Preprocessing is the same as that of the first embodiment. However, the symmetric key cryptosystem which is used in the present embodiment is the probabilistic cryptosystem.

<Authentication Processing>

Authentication processing of the present embodiment will be described by using FIG. 4. First, processing in Steps S213-$n$ to S2154-$n$ described in the second embodiment is executed. However, the authentication device 21-$n$ is replaced with the authentication device 31-$n$ and the authentication devices 21-$m$ are replaced with authentication devices 31-$m$. Moreover, the N−1 response values R(n, m) transmitted from the N−1 authentication device 31-$m$ ($m\in\{1, \ldots, N\}$ and $n\neq m$) are also sent to the decision unit 317-$n$ of each authentication device 31-$n$. The decision unit 317-$n$ decides whether or not a set SET whose elements are these N−1 response values R(n, m) ($m\in\{1, \ldots, N\}$ and $n\neq m$) includes elements identical with each other. In other words, a decision as to whether or not response values R(n, m) which are the same are present in these N−1 response values R(n, m) is made (Step S3154-$n$). Here, when it is decided that the set SET includes elements identical with each other, the processing is returned to Step S213-$n$ based on the assumption that there is a possibility that an illegal operation has been performed, and processing is performed again from the start (processing of a first output unit and processing of a second input unit are performed again). Incidentally, an upper limit to the number of times processing is performed again may be set, and, when the number of times processing is performed again exceeds the upper limit, the authentication processing may be terminated with an error message. On the other hand, when it is decided that the set SET does not include elements identical with each other, processing in and after Step S216-$n$ described in the second embodiment is executed.

<Features of the Present Embodiment>

When the probabilistic cryptosystem is adopted as the symmetric key cryptosystem which is used for the generation of a response, even if the N−1 challenge values C(n, m) which are output from the authentication device 31-$n$ are the same, the possibility that some of the response values R(m, n) returned from the N−1 authentication devices 31-$m$ to the authentication device 31-$n$ are the same is low. In spite of this, when some of the response values R(m, n) are the same, there is a possibility that an illegal operation has been performed. In the present embodiment, since processing is performed again in such a case, it is possible to prevent spoofing using the response value R(m, n) output from any authentication device 31-$m$. In addition thereto, the same effect as that of the second embodiment can be obtained.

[Other Modifications]

It is to be noted that the present invention is not limited to the embodiments described above. For example, in the embodiments described above, an identifier ID(i) is sent along with an authentication request and a challenge value, but the identifier ID(i) may be omitted. In this case, the processing in Steps S1152-$n$, S1152-$m$, and S2152-$n$ is omitted, and Steps S1153-$n$, S1153-$m$, and S2153-$n$ are executed after Steps S1151-$n$, S1151-$m$, and S2151-$n$.

For example, instead of making each device exchange information via a network, at least some sets of devices may exchange information via a portable recording medium. The above-described various kinds of processing may be executed, in addition to being executed in chronological order in accordance with the descriptions, in parallel or individually depending on the processing power of a device that executes the processing or when needed. In addition, it goes without saying that changes may be made as appropriate without departing from the spirit of the present invention.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

In the above-described embodiments, processing functions of the present device are implemented as a result of a predetermined program being executed on the computer, but at least part of these processing functions may be implemented by hardware.

INDUSTRIAL APPLICABILITY

The above-described authentication technology call be applied to, for example, a technical field (such as secret sharing or secure computation) that safely establishes connection between nodes which are not an indefinite number of unreliable terminal devices, (1) the nodes which are not completely reliable and require authentication to be performed thereon, (2) the nodes whose communication channel is not always physically secure, which makes it necessary to perform protection against spoofing, whose total number of terminal devices is definite, and which are allowed to share a common key in advance.

DESCRIPTION OF REFERENCE NUMERALS 1 to 3 authentication system
11-$n$, 21-$n$, 31-$n$ authentication device.

What is claimed is:

1. An authentication device comprising:
a storage that stores a common key; and
a processing circuitry configured to:
perform a first output process of outputting a plurality of first challenge values each corresponding to a random number along with a first authentication request to other authentication devices;
perform a second input process to which a plurality of second challenge values are input each along with a second authentication request;
perform a first input process to which a plurality of first response values are input, where each of the first response values are obtained by encrypting a value corresponding to each of the plurality of first challenge values by using the common key by a symmetric key cryptosystem, and the plurality of first response values being output from the other authentication devices;
perform a second output process of outputting a plurality of second response values each of which are obtained by encrypting a value corresponding to each of the plurality of second challenge values by using the common key by the symmetric key cryptosystem;
decide whether or not a decrypting result which is obtained by decrypting each of the plurality of first response values by using the common key and a value corresponding to each of the first challenge values coincide with each other; and
decide whether or not any pair of the plurality of first response values output from the other authentication devices is identical with each other, wherein
along with the first authentication request for requesting first authentication of the authentication device which is performed by a plurality of other authentication devices, the first output process outputs the first challenge value for second authentication of the plurality of other authentication devices which is performed by the authentication device,
to the second input process, the second challenge value for the first authentication is input along with the second authentication request for requesting the second authentication,
the symmetric key cryptosystem is a probabilistic cryptosystem, and
when any pair of the plurality of first response values output from the other authentication devices is identical with each other, processing of the first output process and processing of the second input process are performed again by the processing circuitry.

2. The authentication device according to claim 1, the processing circuitry being further configured to:
perform a third output process that outputs first authentication success/failure information indicating that authentication has succeeded when the processing circuitry decides that the decrypting result and the value corresponding to the first challenge value coincide with each other and outputs first authentication success/failure information indicating that authentication has failed when the processing circuitry decides that the decrypting result and the value corresponding to the first challenge value do not coincide with each other;
perform a third input process to which second authentication success/failure information is input; and
output information representing that authentication has finally succeeded when both the first authentication success/failure information and the second authentication success/failure information indicate that authentication has succeeded.

3. A non-transitory computer-readable recording medium storing a program for making a computer function as the authentication device according to claim 1 or 2.

4. An authentication method by an authentication device comprising:
a step in which a first output unit outputs a plurality of first challenge values each corresponding to a random number along with a first authentication request to other authentication devices;
a step in which a second input unit to which a plurality of second challenge values are input each along with a second authentication request;

a step in which a first input unit to which a plurality of first response values are input, where each of the first response values are obtained by encrypting a value corresponding to each of the plurality of first challenge values by using a common key by a symmetric key cryptosystem, and the plurality of first response values being output from the other authentication devices;

a step in which a second output unit that outputs a plurality of second response values each of which are obtained by encrypting a value corresponding to each of the plurality of second challenge values by using a common key by the symmetric key cryptosystem;

a step in which a decision unit decides whether or not a decrypting result which is obtained by decrypting each of the plurality of first response values by using the common key and a value corresponding to each of the first challenge value coincide with each other; and a step in which a second decision unit decides whether or not any pair of the plurality of first response values output from the other authentication devices is identical with each other, wherein along with the first authentication request for requesting first authentication of the authentication device which is performed by a plurality of other authentication devices, the first output unit outputs the first challenge value for second authentication of the plurality of other authentication devices which is performed by the authentication device, to the second input unit, the second challenge value for the first authentication is input along with the second authentication request for requesting the second authentication, the symmetric key cryptosystem is a probabilistic cryptosystem, and when any pair of the plurality of first response values output from the other authentication devices is identical with each other, processing of the first output unit and processing of the second input unit are performed again.

* * * * *